Patented Oct. 18, 1932

1,882,887

UNITED STATES PATENT OFFICE

JOHN C. POPE, OF YONKERS, NEW YORK, ASSIGNOR TO STANDARD OIL DEVELOPMENT COMPANY, A CORPORATION OF DELAWARE

SLUDGE RESISTING HYDROCARBON OILS AND METHOD OF MAKING THE SAME

No Drawing.  Application filed March 23, 1928. Serial No. 264,277.

The present invention relates to an improvement in hydrocarbon materials and more specifically comprises a method of manufacture which will be fully understood from the following description.

In a previous application, Serial No. 138,114 by W. L. McCabe and Brian Mead, now Patent No. 1,857,761, issued May 10, 1932, entitled "Non-sludging oil and method of making the same," improvement in oils, greases, and the like by addition of small quantities of one of a certain class of sludge resistant compounds is fully disclosed. It was disclosed that addition of a small quantity of a lead-organic compound, for example tetraethyl lead, greatly decreased the deterioration of oils, greases, and the like, as indicated by darkening in color and the formation of sludge. Although tetraethyl lead is typical of this class of substances, others are enumerated in the above noted application.

The present invention comprises a treatment for oils or greases to which lead-organic agents have been added whereby still further improvement is made in respect to deterioration, especially to oxidation or to deterioration from other causes. I have found that hydrocarbon oils and greases to which tetraethyl lead or similar compounds have been added, on being held at temperatures of 100 to 150° C. frequently become somewhat turbid or cloudy and sometimes a slight precipitate settles. If heating is continued for a prolonged period from 10 to 30 hours or longer and the oil is then filtered to remove the turbidity, great improvement in respect to further sludge formation is noted.

As an example of my invention, the following may be given although it is to be considered as illustrative of my process and in no sense limitative. An oil of the following characteristics is derived from a naphthenic base crude:

Gravity A. P. I _____ 24.5°
Flash open cup _____ 275° F.
Viscosity Saybolt _____ 60 sec. at 100° F.

To a litre of the oil, .005 mols of tetraethyl lead is added and thoroughly mixed therewith. Samples each 20 c. c. were heated and maintained at 150° C. for 30 hours or more in an oil bath capable of being regulated to within 1° C. Samples are protected from impurities but free access to air is permitted. A slight darkening of the oil is observed and turbidity which settles as a gray or buff colored precipitate. The oil is filtered to remove the precipitate and clarify the oil and it is found that little or no sludge is formed if heating is continued as before. Treated oils are much more stable in respect to sludge formation than untreated oils and the former darken only slightly in comparison with the latter.

Other lead-organic compounds, such as tetraphenyl lead, lead triethyl bromide, and lead triethyl acetate may be used in quantity from 0.01 to 1.0% although approximately 0.07% is preferable. My improved process may be applied to hydrocarbon oils of different characteristics, such as are required for transformer oils, switch oils, turbine oils, and the like. In fact my process is advantageous wherever a high grade sludge-resistant oil is required. It is preferred to use an oil heavier than kerosene, but the method is applicable to any oil heavier than butane. Also, not only oils, but greases such as petrolatum, petroleum jelly, and the like may be treated according to my process with improvement in respect to sludge-resistant properties.

I am unable to state whether the lead-organic compound added to the oil survives the heat treatment or whether it is converted to another substance, but I am content to state the steps of the improved process. The turbid matter when filtered from the oil is found to contain lead, and lead is also present in the oil after filtration.

My invention is not to be limited by any theory of the chemical or physical explanation of my process nor by any example given by way of illustration but only by the attached claims in which I wish to claim all novelty inherent in my process.

I claim:

1. An improved process for manufacturing sludge-resistant hydrocarbon products, comprising adding a small quantity of a lead-organic compound to a suitable hydrocarbon heavier than butane, subjecting the mixture to prolonged heating, and removing the precipitate formed during heating.

2. A process according to claim 1 in which the heat treatment period is from 10 to 30 hours.

3. A process according to claim 1 in which temperature of the hydrocarbon during heating is between approximate limits of 100° and 150° F.

4. A process according to claim 1 in which .01 to 1.0% of a lead-organic compound is added to the hydrocarbon.

5. A process according to claim 1 in which tetraethyl lead is added to a hydrocarbon oil heavier than kerosene.

6. A process for manufacturing sludge-resistant oil comprising adding .01 to 1.0% tetraethyl lead to a hydrocarbon oil, maintaining the oil at temperature of 100°–150° C. for at least 10 hours and filtering the oil.

7. Process according to claim 6 in which a distillate from a naphthenic base crude is used.

8. A sludge-resistant material comprising a hydrocarbon heavier than butane and a lead-organic compound, characterized by the fact that a lead-organic compound has been added thereto and that the mixture has been heated for a prolonged period and finally filtered.

9. A sludge-resistant oil, according to claim 9, characterized by the fact that a small quantity of tetraethyl lead has been added thereto and that the mixture has been heated for at least 10 hours at 100° to 150° C.

10. A sludge-resistant oil comprising an oil heavier than kerosene, derived from a napthenic base crude, and tetraethyl lead, characterized by the fact that .01 to 1.0% of tetraethyl lead has been added thereto, the mixture heated and finally filtered.

11. The process of manufacturing sludge-resistant oil of the naphthenic series, which comprises adding a lead organic compound to a distillate of a naphthenic base crude, subjecting the mixture to prolonged heating, and removing the precipitate formed during heating.

JOHN C. POPE.